US008347861B2

(12) United States Patent
Shimizu et al.

(10) Patent No.: US 8,347,861 B2
(45) Date of Patent: Jan. 8, 2013

(54) METHOD TO CONTROL A GAS ENGINE AND A GAS ENGINE SYSTEM THEREOF

(75) Inventors: Yuuichi Shimizu, Yokohama (JP); Hideki Nishio, Yokohama (JP); Hajime Suzuki, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 248 days.

(21) Appl. No.: 12/450,920

(22) PCT Filed: Nov. 20, 2008

(86) PCT No.: PCT/JP2008/071591
§ 371 (c)(1),
(2), (4) Date: Feb. 25, 2010

(87) PCT Pub. No.: WO2009/078259
PCT Pub. Date: Jun. 25, 2009

(65) Prior Publication Data
US 2011/0247589 A1 Oct. 13, 2011

(30) Foreign Application Priority Data
Dec. 14, 2007 (JP) .................................. 2007-323879

(51) Int. Cl.
*F02D 41/00* (2006.01)
*F02M 37/00* (2006.01)
*F02M 61/00* (2006.01)

(52) U.S. Cl. ........................................ 123/445; 123/510

(58) Field of Classification Search ................... 123/445, 123/478, 480, 494, 495, 510, 525, 527, 528, 123/535, 538, 552, 557
See application file for complete search history.

(56) References Cited

U.S. PATENT DOCUMENTS
4,537,172 A * 8/1985 Kanehara et al. ............. 123/527
(Continued)

FOREIGN PATENT DOCUMENTS
EP 1 980 740 1/2007
(Continued)

OTHER PUBLICATIONS
WIPO, International Preliminary Report on Patentability, Jun. 15, 2010.

*Primary Examiner* — John T. Kwon
*Assistant Examiner* — Johnny Hoang
(74) *Attorney, Agent, or Firm* — Manabu Kanesaka; Kenneth M. Berner; Benjamin J. Hauptman

(57) ABSTRACT

In a gas engine system, air fed through a turbocharger is mixed with fuel gas flowing through a fuel gas supply line and supply into a combustion chamber is controlled. In case that the fuel gas has a low calorie or the engine output power is high, a portion of the fuel gas is diverged from the fuel gas supply line, and the flow rate thereof is set to a constant rate less than that of the diverged side fuel gas. The diverging fuel gas is fed into the combustion chamber through a divergence control valve while the remainder of the fuel gas is fed into the fuel flow control valve. In case that the fuel gas has a high calorie or the engine output power is low, the divergence control valve is closed so as to feed the fuel gas only into the gas supply main pipe.

6 Claims, 2 Drawing Sheets

U.S. PATENT DOCUMENTS

| | | | |
|---|---|---|---|
| 5,868,121 A | 2/1999 | Brown et al. | |
| 5,873,351 A * | 2/1999 | Vars et al. | 123/527 |
| 6,041,765 A * | 3/2000 | O'Neill et al. | 123/683 |
| 6,050,246 A * | 4/2000 | Abdelmesih | 123/527 |
| 6,266,956 B1 * | 7/2001 | Suzuki et al. | 60/278 |
| 6,457,467 B1 * | 10/2002 | O'Neill et al. | 123/683 |
| 6,938,638 B2 * | 9/2005 | Kubota et al. | 137/240 |
| 2002/0025461 A1 * | 2/2002 | Shimada | 429/19 |
| 2002/0069862 A1 * | 6/2002 | Faletti | 123/568.17 |
| 2002/0134429 A1 * | 9/2002 | Kubota et al. | 137/240 |
| 2003/0116142 A1 * | 6/2003 | Miller et al. | 123/516 |
| 2003/0121494 A1 * | 7/2003 | Yosikane | 123/243 |
| 2004/0048124 A1 * | 3/2004 | Yamada | 429/26 |
| 2004/0211395 A1 * | 10/2004 | Greco et al. | 123/497 |
| 2005/0051113 A1 * | 3/2005 | Wakao et al. | 123/3 |
| 2005/0115226 A1 * | 6/2005 | Benz et al. | 60/287 |
| 2006/0059897 A1 * | 3/2006 | Benz et al. | 60/286 |
| 2006/0191513 A1 * | 8/2006 | Gray, Jr. | 123/435 |
| 2006/0223014 A1 * | 10/2006 | Svensson | 431/11 |
| 2006/0228611 A1 * | 10/2006 | Nakata et al. | 429/34 |
| 2007/0089395 A1 * | 4/2007 | Fujii et al. | 60/39.281 |
| 2009/0125207 A1 * | 5/2009 | Nomura et al. | 701/100 |
| 2010/0126170 A1 * | 5/2010 | Nishio et al. | 60/611 |
| 2011/0005501 A1 * | 1/2011 | Eberhard | 123/550 |

FOREIGN PATENT DOCUMENTS

| | | |
|---|---|---|
| JP | S59-010770 A | 1/1984 |
| JP | S62-58030 | 3/1987 |
| JP | H03-275968 | 12/1991 |
| JP | H09-317567 | 12/1997 |
| JP | H10-220227 | 8/1998 |
| JP | 2001-132550 | 5/2001 |
| JP | 2005-54613 | 3/2005 |
| JP | 2006-249954 | 9/2006 |

* cited by examiner

METHOD TO CONTROL A GAS ENGINE AND A GAS ENGINE SYSTEM THEREOF

BACKGROUND OF THE INVENTION

1. Technical Field

The present application relates to a method to control a gas engine and a gas engine system thereof, the engine being provided with: either a turbocharger or a supercharger through which air is supplied to the engine [henceforth in this application, whenever the word 'turbocharger' appears, it could equally well be replaced by 'supercharger']; a first gas control valve that controls flow-rates of fuel-gas to be supplied to each cylinder of the engine; whereby, the fuel-gas that is regulated by the first gas valve and the air that is supplied through the turbocharger are mixed so as to form a prescribed air-fuel ratio; and, the engine burns the supplied fuel-gas under conditions of the prescribed air-fuel ratio; and in particular this invention relates to a method to control a gas engine and a gas engine system thereof, capable of controlling the air-fuel ratio with a high degree of accuracy even in the case of using a fuel gas having a low calorie so as to be likely to vary its calorific value or in the case of large variation in the output power of an engine.

2. Description of the Related Art

Heretofore, of gas engines, a small-sized gas engine has in particular utilized a pre-turbocharger intake system in which fuel gas and air are mixed, in general, upstream of a turbocharger, and are then fed into a combustion chamber.

Meanwhile, in most of conventional large-sized gas engines, fuel gas has been fed into a combustion chamber by means of a fuel gas regulator valve located just before each of cylinders since a mixing ratio between fuel gas and air (that is, an air-fuel ratio) and a gas charge should be uniform for every cylinder. With the use of this system, the air-fuel ratio and the gas charge which are inputted into every cylinder can be uniform, and the working in every cylinder can become more efficient, and further, because of the configuration that the fuel gas and air are mixed just before a cylinder, an inflammable zone in a gas supply passage can be shortened, thereby it is possible to enhance the safety.

Further, Patent Document 1 (Japanese Patent Laid-Open No. 2001-132550) proposes a technology in combination of both systems as stated above. In this technology, fuel gas pressurized by a gas compressor is fed into a cylinder inlet in a intake passage or into a cylinder while fuel gas before being compressed by a gas compressor is fed into an air passage upstream of a turbocharger, and the supply of fuel gas into the cylinder side and the supply of fuel gas into the upstream side of the turbocharger can be changed over.

However, in the configuration disclosed in the Patent Document 1, it is required to compress the fuel gas up to a pressure higher than a supercharged air pressure in the fuel gas supply system in which the fuel gas compressed by the gas compressor is fed into the cylinder inlet of the intake passage or into the cylinder, but the gas compressor has to have a large-size and a large capacity in order to compress gas having a low pressure and a high flow rate in the case of using a low calorie gas (gas having a low calorific value) such as mine methane gas as the fuel gas. Meanwhile, the fuel gas supply system in which fuel gas before being compressed by the gas compressor is fed into the air passage upstream of the turbocharger, possibly causes a risk of detonating the fuel gas at the outlet of the turbocharger since inflammable fuel gas is compressed up to a high temperature and a high pressure within the turbocharger.

Accordingly, Patent Document 2 (Japanese Patent Laid Open No. 2006-249954) discloses the configuration that the fuel gas in one of both systems is mixed with air at the inlet of the turbocharger in order to feed the thus obtained mixture into the turbocharger while the fuel gas in the other system is mixed with intake air in an intake passage for each of cylinders so as to feed the thus obtained mixture into the associated one of cylinders, and there are provided a turbocharger side fuel flow control valve for regulating the flow rate of gas in the turbocharger side gas supply passage, a cylinder side fuel flow control valve for regulating the flow rate of the gas in the cylinder side gas supply passage for each of the cylinders, and a gas flow controller for controlling the opening degree of the turbocharger side fuel flow control valve so as to regulate the quantity of fuel gas fed into the supercharge side gas supply passage in order to maintain the density of the fuel gas in the mixture fed into the turbocharger at a value which is not greater than an inflammable limit gas density. With this configuration, the detonation of fuel gas at the inlet of the turbocharger can be completely avoided, and as well, the drive power of the gas compressor for compressing fuel gas fed into the intake passage for each of the cylinders can be reduced even in the case of using a low calorie gas (gas having a low calorific value), thereby it is possible to reduce the size and the capacity of the gas compressor.

As stated above, in view of the configuration disclosed in the Patent Document 2, a sufficient supply quantity of fuel gas can be ensured even with a low calorie gas, and as well the size and the capacity of the gas compressor for compressing fuel gas can be reduced. However, there has been desired a control method in which the quantity of fuel gas to be mixed with air at the inlet of the turbocharger can be appropriately controlled with a simple configuration, and which can be applied to the system that the calorie of the fuel gas varies.

SUMMARY OF THE INVENTION

Accordingly, the present invention is devised in view of the above-mentioned problems inherent to the above-mentioned conventional technology, and accordingly, an object of the present invention is to provide a method of controlling a gas engine system, which is capable of controlling an air fuel with a high degree of accuracy even with the use of a fuel gas having a low calorie and having a calorific value which is likely to vary, and this system.

To the end, according to the present invention, there is provided a method of controlling a gas engine system in which air fed through a turbocharger is mixed with a fuel gas fed through a fuel gas supply line and controlled as to the flow rate thereof by a fuel flow control valve so as to produce a mixture which is then fed into a combustion chamber for ignition and combustion of an engine, characterized by the steps of, in the case that the fuel gas has a low calorie or the engine output power is high, diverging a part of the fuel gas fed through the fuel gas supply line, upstream of the fuel flow control valve, the flow rate of the fuel gas on the diverging side being set to a constant value which is lower than that of the fuel gas on the diverged side, feeding the diverged fuel gas into the combustion chamber through a divergence control valve arranged on a fuel gas supply diverging pipe and subjected to on-off control, feeding the remainder of the fuel gas from the fuel gas supply line, through a gas supply main pipe and into the fuel flow control valve for controlling the quantity of the fuel gas in order to set the mixture fed into the combustion chamber to a predetermined air-fuel ratio, and the step of, in the case that the fuel gas has a high calorie or the engine output power is low, closing the divergence control vale so as to feed the fuel gas into only the gas supply main pipe.

With the configuration of the present invention in which the fuel gas is fed by way of the gas supply diverging pipe in the case that the supply volume of the fuel gas becomes larger, that is, in the case that a fuel gas has a low calorie or the engine output power is high, the air-fuel ratio can be controlled with a high degree of accuracy while a required fuel gas quantity is ensured.

Since the fuel gas and the air are mixed with each other just before a cylinder, the path of the mixture gas up to the cylinder can be shortened so as to avoid the risk of detonation or the like, thereby it is possible to ensure the safety.

Further, the present invention is characterized in that a gas regulating valve for regulating the flow rate of the fuel gas is incorporated on each of gas supply diverging branch pipes which are connected from the gas supply diverging pipe to the respective combustion chambers of the engine, and accordingly, in the case of a failure of one of the combustion chambers of the engine, both fuel flow control valve and gas regulating valve which correspond to the applicable combustion chamber are closed under control in order to shut off the flowing fuel gas.

If any one of cylinders (combustion chambers) fails during the operation of the gas engine, the fuel flow control valve and the divergence control valve which correspond to the applicable cylinder are closed so as to cease the operation of only the cylinder which has failed without ceasing the operation of gas engine in its entirety, thereby it is possible to surely cease the supply of the fuel gas to the cylinder.

Further, the present invention is characterized in that the opening degree of the fuel flow control valve is detected while an output power of the engine is detected in order to determine the case that the fuel gas has a low calorie or the output power of the engine is high if the fuel flow control valve is fully opened and the output power of the engine tends to increase, and accordingly, the divergent control valve is opened.

With this configuration, whether the fuel gas fed through the gas diverging pipe is required or not can be simply and surely determined, thereby it is possible to carry out the air-fuel ratio control with a high degree of accuracy.

Moreover, the present invention is characterized in that by detecting the output power of the engine in the condition that the gas supply valve is opened, it is determined that the fuel gas has a high calorie or the output power of the engine has been lowered when the output power of the engine becomes not greater than a predetermined value which has been previously set, and accordingly, the divergence control valve is closed.

Thus, the maximum threshold value of the flow rate of fuel gas which can be controlled by the fuel gas flow control valve has been previously determined, and when the flow rate of fuel gas becomes not higher than a predetermined value corresponding to the threshold value, the divergence control valve is closed so that the flow rate of fuel gas is regulated only by the fuel flow control valve, thereby it is possible to carry out the air-fuel control with a high degree of accuracy in a simple manner.

Further, according to the present invention, there is provided a control apparatus for a gas engine, incorporating an intake air flow control valve for controlling the quantity of intake air which has been fed by way of a turbocharger, and which is to be fed into a combustion chamber, a fuel flow control value provided on a fuel supply pipe, for controlling the supply quantity of fuel gas to be fed into the combustion chamber, and a fuel injection device for mixing the intake air and the fuel gas into a mixture having a required air-fuel ratio, and for feeding the mixture into the combustion chamber, characterized in that the fuel supply pipe is diverged into a gas supply main pipe connected to the combustion chamber, and a gas supply diverging pipe which is diverged from the fuel supply pipe, upstream of the fuel flow control valve, and the gas supply diverging pipe is provided thereon with a divergence control valve which is subjected to ON/OFF control so as to allow the fuel gas to flow therethrough in an opened condition thereof at a flow rate which is less than the flow rate of fuel gas flowing through the gas supply main pipe.

Further, the present invention is characterized in that each of the gas supply diverging branch pipes which are connected from the gas supply diverging pipe to the respective combustion chambers, is provided thereon with a gas regulating valve for regulating the flow rate of the fuel gas.

As stated above, according to the present invention, there can be provided a control method for a gas engine system capable carrying out air-fuel ratio control with a high degree of accuracy even in the case of using fuel gas which has a low calorie and which is likely to vary its calorific value, and as well the engine system.

That is, according to the present invention, the fuel gas is fed through both gas supply diverging pipe and gas supply diverging branch pipes only in the case that the supply quantity of fuel gas becomes larger, that is, for example, in the case that the fuel gas has a low calorie or the output power of the engine becomes higher, there by it is possible to carryout air-fuel ratio control with a high degree of accuracy while ensuring a required quantity of fuel gas.

According to the present invention, since the mixing of fuel gas and air is carried out just before a cylinder, the path of the mixture gas to the cylinder can be shortened, and accordingly, occurrence of a risk of detonation or the like can be avoided, thereby it is possible to ensure the safety.

Further, during operation of the gas engine, if any one of the cylinders fails, the fuel flow control valve and the divergence control valve which correspond to the applicable cylinder are closed so as to cease the operation of only the failed cylinder without ceasing the operation of the engine in its entirety, thereby it is possible to surely cease the supply of fuel gas into the cylinder.

Moreover, when the fuel gas is fed through the supply diverging pipe and the gas supply diverging branch pipes, the fuel gas is fed at a certain fixed flow rate, and accordingly, it is possible to simply carry out the air-fuel ratio control in the fuel flow control valve.

Further, if the fuel flow control valve is fully opened while the output power of the engine tends to become higher, the gas supply valve is opened, and accordingly, whether the supply of fuel gas through the gas supply diverging pipe and the gas supply diverging branch pipes is required or not can be simply and surely determined, thereby it is possible to carry out the air-fuel ratio control with a high degree of accuracy.

Further, when the output power of the engine becomes not higher than a predetermined value, the divergence control valve is closed; thereby it is possible to surely carry out the air-fuel ratio control with a high degree of accuracy.

DETAILED DESCRIPTION OF THE INVENTION

Next detailed explanation will be exemplarily made of a preferred embodiment of the present invention with reference to the accompanying drawings. It is noted that dimensions, materials, shapes, relative arrangement and the like of components described in this embodiment are mere examples, and should not intend to limit the technical scope of the present invention thereto unless otherwise specified.

Figure 1:
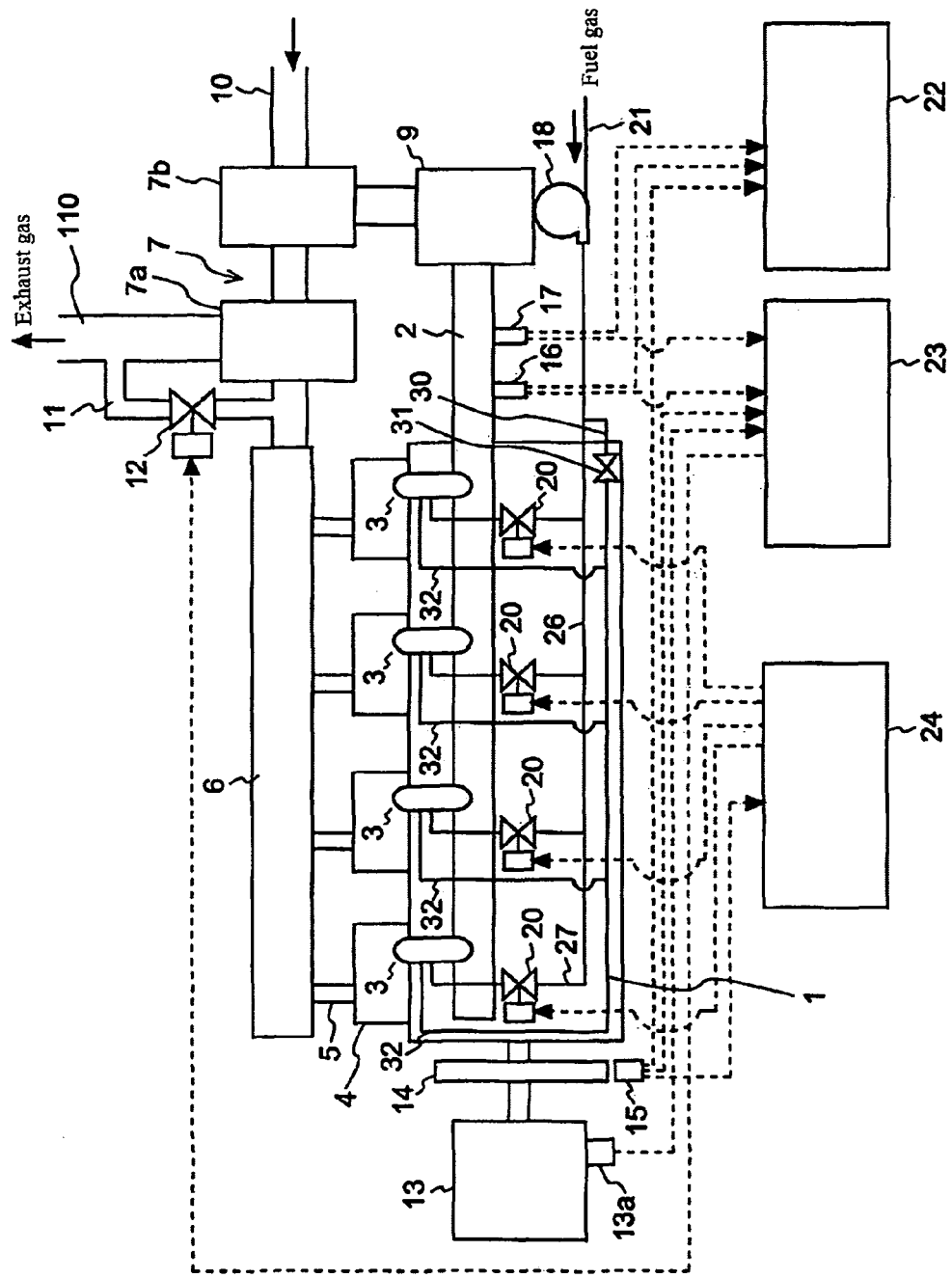
FIG. 1 is a view illustrating the entire configuration of a gas engine system in an embodiment of the present invention.
Figure 2:
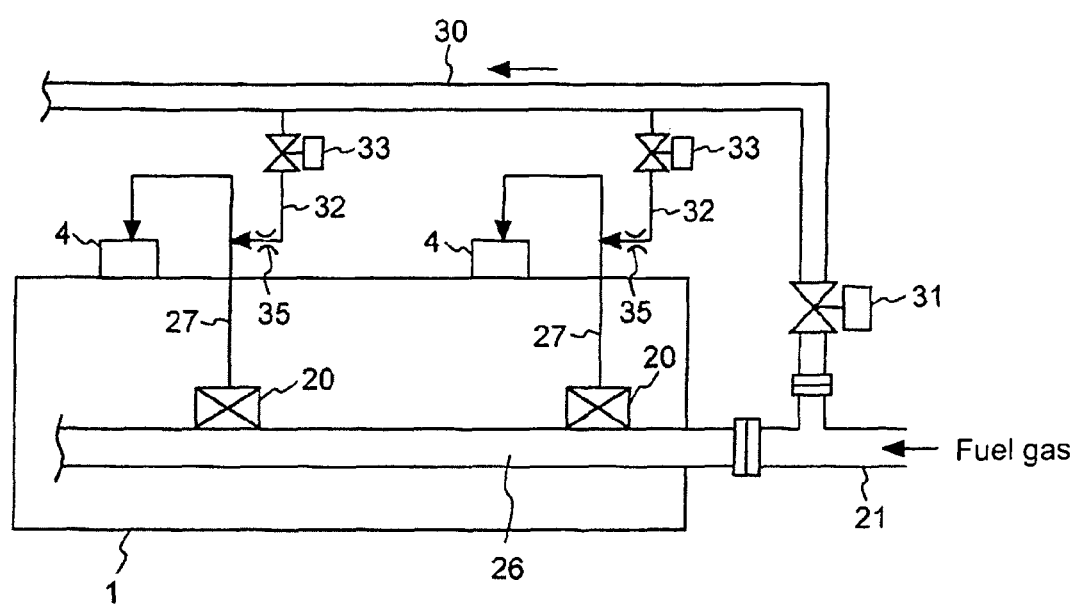
FIG. 2 is an enlarged view of a part of a bypass structure shown in FIG. 1.

FIG. 1 is a view illustrating an entire configuration of a gas engine system in an embodiment of the present invention, and FIG. 2 is an enlarged view illustrating a part of a bypass structure shown in FIG. 1.

It is noted that explanation will be hereinbelow made of a gas engine incorporated therein with a turbocharger and having a subsidiary chamber for ignition for driving a generator as an example. However, the configuration of this embodiment should not be limited to this type of gas ending systems, that is, this embodiment may be applied to combustion type gas engines. Further, although the generator as shown is preferable as the object to be driven by the engine system, this embodiment may be applied in the case other than the generator.

Referring to FIG. 1, explanation will be made of the entire configuration of a gas engine system in this embodiment of the present invention.

In this figure, there are shown an engine (gas engine) 1, cylinder cover 4 for each cylinder of this gas engine 1, a generator 13 directly coupled to and driven by the engine 1, a flywheel 14, a turbocharger 7 composed of an exhaust turbine 7a and a compressor 7b, charging air inlet branch arm pipes 3 connected respectively to intake air ports of the cylinder cover 4 for each cylinder, an charging air manifold 2 connecting an intake air inlet port of the compressor 7b to the charging air inlet branch arm pipes 3, and an intake air cooler 9 for cooling intake air flowing through the charging air manifold 2.

Further, there are shown exhaust pipes 5 connected respectively to exhaust ports of the cylinders heads, an exhaust manifold 6 connected thereto with the exhaust pipes 5, an exhaust outlet pipe 110 for discharging exhaust gas from an exhaust output port of the exhaust turbine 7a.

There are also shown an exhaust bypass pipe 11 which is diverged from the exhaust manifold 6 on the inlet side of the exhaust turbine 7a, bypassing the exhaust turbine 7a, and is connected to the exhaust outlet pipe 110 on the outlet side of the exhaust turbine 7a, and an exhaust bypass valve 12 for changing the passage area of the exhaust bypass pipe 11.

Further, there are shown an air inlet passage 10 toward the turbocharger for introducing air from the outside into the compressor 7b of the turbocharger 7, a gas supply line 21 into which fuel gas is introduced from a fuel gas tank (which is not shown) for reserving the fuel gas, and which is connected to a gas supply main pipe 26, and is branched from the intermediate part of the gas supply main pipe 26, into gas supply branch pipes 27 for the respective cylinders, which are connected respectively to the charging air inlet branch arm pipes 3.

Further, there are shown a gas compressor 18 connected in the cylinder side gas supply line 21, for compressing fuel gas flowing through the cylinder side gas supply line 21, a fuel flow control valve 20 connected in each of the gas supply branch pipes 27, for controlling the passage area of each gas supply branch pipe 27, that is, controlling the flow rate of the fuel gas.

A gas supply diverging pipe 30 which is diverged from the gas supply line 21 is diverged upstream of the fuel flow control valve 20, in view of the gas flow, and the flow rate of the gas flowing through the gas supply diverging pipe 30 is set to be lower than that of the gas flowing through the gas supply main pipe 26.

Further, there are shown a speed sensor 15 for detecting a revolution speed of the engine, a load sensor 13a for detecting a load of the generator 13, that is to say, an engine load, an intake air pressure sensor 17 for detecting a pressure of intake air in the charging air manifold 2, and an intake air temperature sensor 16 for detecting a temperature of intake air in the charging air manifold 2.

There are also shown a speed controller 24, an air-fuel ratio controller 23 and a gas flow controller 22. A detected value of an engine revolution speed from the speed sensor 15 is delivered to the speed controller 24, the air-fuel ratio controller 23 and the gas flow controller 22, and further, a detected value of an engine load from the load sensor 13a is delivered to the air-fuel ratio controller 23, and a detected value of an intake air pressure from the intake air pressure sensor 17 is delivered to the air-fuel ratio controller 23 and the gas flow controller 22 while a detected value of an intake air temperature from the intake air temperature sensor 16 is delivered to the air-fuel ratio controller 23 and the gas flow controller 22.

The speed controller 24 which is usually an electronic governor, is adapted to control the opening degree of each cylinder side fuel flow control valve 20 so as to regulate the engine speed at a desired speed which is set being based upon the detected value of an engine speed from the engine speed sensor 15 delivered from the engine speed sensor 15.

The air-fuel ratio controller 23 controls the opening degree of the exhaust bypass valve 12 with the use of the means which will be described later, being based upon the detected value of an engine speed from the engine speed sensor 15, the detected value of an engine load from the engine load sensor 13a, the detected value of an intake air pressure from the intake air pressure sensor 17 and the detected value of an intake air temperature from the intake air temperature sensor 16. The gas flow controller 22 controls the opening degree of the fuel flow control valve 20, being based upon the detected value of an engine speed from the engine speed sensor 15, the detected value of an intake air pressure from the intake air pressure sensor 17 and the detected value of an intake air temperature from the intake air temperature sensor 16.

Explanation will be made of the bypass structure for the fuel gas, which is the essential feature of this embodiment, with reference to FIG. 2. As shown in this figure, the fuel gas supply line 21 is diverged, downstream of the gas compressor 18 but upstream of the fuel flow control valve 20, into the fuel gas supply main pipe 26 and the fuel gas supply diverging pipe 30.

The fuel gas supply main pipe 26 is branched for the respective cylinders, into gas supply branch pipes 27 which are then connected to the respective charging air inlet branch arm pipes 3.

Meanwhile, the gas supply diverging pipe 30 is branched for the respective cylinders, into gas supply diverging branch pipes 32 which are then connected to the respective charging air inlet branch arm pipes 3. On the gas supply diverging pipe 30, there is provided, upstream of the diverging point of the gas supply diverging branch pipes 32, a divergence control valve 31 for controlling the flow of fuel gas into the gas supply diverging pipe 30. The divergence control valve 31 carries out On/Off control, for controlling whether the flow of fuel gas is present or not, that is when the divergence control valve 31 is opened, fuel gas flows through the gas supply diverging pipe 30 at a predetermined flow rate which is less than that in the gas supply main pipe 26. Preferably, the flow rate of gas in the gas supply diverging pipe 30 is set to 10 to 30% and more preferably to about 20% of the flow rate of gas in the gas supply main pipe 26.

Divergence control valves 33 are incorporated respectively on the gas supply diverging branch pipes 32. Each of the divergence control valves 33 carries out ON/OFF control, so as to serve as a valve for controlling whether the flow of fuel gas is present or not, and is maintained to be opened, as a rule, when fuel gas flows through the gas supply diverging pipe 30.

During the operation of the gas engine, if any one of the cylinders fails, the fuel flow control valve 20 and the divergence control valve 33 which correspond to the applicable cylinder are closed. Thus, the operation of a failed cylinder alone is ceased without ceasing the operation of the entire engine, thereby it is possible surely stop the supply of fuel gas into the cylinder.

Further, an orifice 35 is preferably provided on each of the gas supply diverging branch pipes 32, thereby it is possible to appropriately control the flow rate of fuel gas fed into the associated cylinder from the gas supply diverging branch pipe 32.

During the operation of the gas engine having the above-mentioned configuration, fuel gas from the gas supply line 21 is compressed by the gas compressor 18, and is then diverged, intermediate of the gas supply line 21. Further, one portion of diverged fuel gas flows through the gas supply main pipe 26 and the gas supply branch pipes 27 for the respective cylinders, and then flows into the respective intake branch pipes 3 where it is mixed in to the above-mentioned mixture which is then fed into the respective cylinders.

Further, another portion of diverged fuel gas flows through the gas diverging pipe 30 if the divergence control valve 31 is opened, and flows through the gas supply diverging branch pipes 32 and into the charging air inlet branch arm pipes 3 in which it is mixed, together with the fuel gas fed from the gas supply main pipe 26, into the mixture which is then fed into the cylinder. It is noted that the gas regulating valve 33 is preferably maintained in a normally pen condition, that is, it is preferably closed under control as necessary in the case that a cylinder fails and so forth. However, it may be associated with the divergence control valve 31 so as to be set under control in the same condition as that of the divergence control valve 31.

Further, exhaust gas from the cylinders of the engine 1 flows through the exhaust pipes 5 so as to be merged in the exhaust manifold 6, and is then fed into the exhaust turbine 7a of the turbocharger 7 for driving the exhaust turbine 7a before it is discharged to the outside through an exhaust outlet pipe 110.

Further, when the exhaust valve 12 is opened in response to a control operation signal which will be described later, from the air-fuel ratio controller 23, a part of the exhaust gas in the exhaust manifold 6 is discharged into the exhaust outlet pipe 110, bypassing the exhaust turbine 7a.

In the control method in this embodiment, in the case that the fuel gas has a low calorie or the engine output power is high, the divergence control valve 31 is opened, and both supply of fuel gas from the fuel flow control valve 20 and supply of fuel gas from the divergence control valve 31 are carried out. Meanwhile, in the case that the fuel gas has a high calorie or the engine output power is low, the divergence control valve 31 is closed, and accordingly, the fuel gas is fed only from the fuel flow control valve 20.

Specifically, by detecting an opening degree of the fuel flow control valve 20 and an engine output power, the divergence control valve 31 is opened under control if the opening degree of the fuel flow control valve 20 becomes 100% or a value therearound (preset value) while the engine output power tends to be increasing. Then, the opening degree control is carried out by the fuel flow control valve 20 so as to regulate the fuel gas supply quantity in order to obtain a predetermined air-fuel ratio by adding the fuel gas having a quantity of a predetermined rate and fed from the divergence control valve 31. That is, at the time when the divergence control valve 31 is opened to 100%, an instruction value for the fuel flow control valve 20 becomes lower than 100%.

Further, in the condition that the opening degree of the divergence control valve 31 is maintained at 100%, the flow rate of fuel gas is controlled by the fuel flow control valve 20 in accordance with an engine output power. At this time, as stated above, a predetermined flow rate of fuel gas from the divergence control valve 31 and a flow rate of fuel gas controlled by the fuel flow control valve 20 are set so as to obtain a predetermined mixture ratio or air-fuel ratio with respect to air fed from the turbocharger.

Further, an engine output power is detected in the condition that the divergence control valve 31 is opened, and if the engine power becomes not higher than a predetermined value, it is determined that the fuel gas has a high calorie or the engine output power becomes lower. Thus, the divergence control valve 31 is closed, and accordingly, the air-fuel ratio control is carried out only by the fuel flow control valve.

Thus, the maximum threshold value for the fuel gas flow rate which can be controlled by the fuel flow control valve 20 has been determined beforehand, and if the flow rate becomes not higher than a predetermined value which corresponds to the maximum threshold value, the divergence control valve 31 is closed. Accordingly, the fuel gas flow rate is regulated only by the fuel gas flow control valve. Thus, the control can be simply made with a high degree of accuracy. Further, even though a misfiring occurs, the divergence control valve 31 is preferably closed.

As stated above, according to this embodiment, only when the supply quantity of the fuel gas becomes larger, such as in the case that the fuel gas has a low calorie or the engine output power becomes higher, the fuel gas is fed through the gas supply diverging pipe 30 and the gas supply diverging branch pipes 32, and accordingly, the air-fuel ratio control can be made with a high degree of accuracy while a required fuel gas quantity is ensured.

Further, according to this embodiment, since the mixing of fuel gas and air is carried out just before a cylinder, the path of the mixture gas up to the cylinder can be shortened, and accordingly, the risk of occurrence of detonation or the like can be avoided, thereby it is possible to ensure the safety.

Moreover, during the operation of a gas engine, if any one of cylinders fails, the fuel flow control valve 20 and the divergence control valve 33 which correspond to the applicable cylinder are closed so as to cease the operation of the failed cylinder alone without ceasing the operation of the engine in its entirety, thereby it is possible to surely stop the supply of fuel gas into the cylinder.

Further, since a certain fixed flow rate of fuel gas is fed when the fuel gas is fed through the gas supply diverging pipe 30 and the gas supply diverging branch pipe 32, the air-fuel ratio control in the fuel flow control vale 20 can be simply carried out.

Further, by opening the gas supply valve when the fuel flow control valve 20 is opened to it full opening degree while the engine output power tends to increase, whether the fuel gas supplied through the gas supply diverging pipe 30 and the gas supply diverging branch pipe 32 is required or not can be simply determined, thereby it is possible to carry out the air-fuel ratio control with a high degree of accuracy.

Further, by closing the divergence control valve 31 when the engine output power becomes not higher than a predetermined value which has been preset, it is possible to simply carry out the control with a high degree of accuracy.

INDUSTRIAL APPLICABILITY

According to this embodiment, in an engine system incorporating both fuel gas supply system in which fuel gas is mixed with air at the inlet of the turbocharger, and the thus obtained mixture is fed into the turbocharger, and fuel gas supply system in which fuel gas is fed into intake air passages for respective cylinders, the possibility of detonation of fuel gas at the outlet of the turbocharger can be completely eliminated, and the power of a gas compressor for compressing fuel gas fed into the intake air passages for the respective cylinders can be reduced in the case that the fuel gas has a low calorie, thereby it is possible to provide a gas engine having the gas compressor which is small-sized and which has a low capacity.

The invention claimed is:

1. A method of controlling a gas engine system, in which air fed through a turbocharger is mixed with fuel gas flowing through a fuel gas supply line and controlled as to a fuel supply quantity by a fuel flow control valve, and a thus obtained mixture gas is fed into a combustion chamber in order to carry out ignition and combustion of an engine, comprising the steps of, when a case that the fuel gas has a low calorie or an engine output power is high, diverging a portion of the fuel gas in the fuel gas supply line upstream of the fuel flow control valve, a flow rate of the fuel gas diverged into a gas supply diverging pipe being set to a constant value which is less than a flow rate of the fuel gas of a gas supply main pipe, feeding a diverging fuel gas into each of charging air inlet branch arm pipes connected respectively to an intake air port of a cylinder cover from the gas supply diverging pipe through a divergence control valve arranged on the gas supply diverging pipe and subjected to ON/OFF control, and then into the combustion chamber, feeding a remainder of the fuel gas into the fuel flow control valve for controlling a quantity of the fuel gas so as to set the mixture gas to be fed into the combustion to a predetermined air-fuel ratio, the fuel flow control valve being provided to each of gas supply branch pipes which is branched off from the gas supply main pipe for a respective cylinder, feeding the fuel gas into each of the gas supply branch pipes for a quantity controlled at the fuel flow control valve, and then into the combustion chamber, and controlling a sum of the flow rates of the diverging fuel gas having the constant value fed from the divergence control valve and the fuel gas of which the flow rate is controlled by the fuel flow control valve by controlling opening degree of the fuel flow control valve so that the sum of the flow rates is adjusted in accordance with the engine output power, and when the fuel gas has a high calorie or the engine output power is low, closing the divergence control valve, feeding the fuel gas only from the fuel flow control valve into the combustion chamber, and controlling the opening degree of the fuel flow control valve so that the flow rate of the fuel gas is controlled in accordance with the engine output power.

2. A method of controlling an engine system as set forth in claim 1, wherein a gas regulating valve for regulating the flow rate of the fuel gas is incorporated on a gas supply diverging branch pipe connected from the gas supply diverging pipe to each of the combustion chambers of the engine, and in the case that any one of the combustion chambers of the engine fails, the fuel flow control valve and the gas regulating valve which correspond to an applicable combustion chamber are both closed so as to shut off the fuel gas on flowing.

3. A method of controlling a gas engine system as set forth in claim 1, wherein the opening degree of the fuel flow control valve and the engine output power are detected, it is determined that the fuel gas has the low calorie or the engine output power is high if the opening degree of the fuel flow control valve is in a fully opened condition while the engine output power tends to increase, and accordingly, the divergence control valve is opened.

4. A method of controlling a gas engine system as set forth in claim 1, wherein the engine output power is detected in the condition that the divergence control valve is opened, it is determined that the fuel gas has the high calorie or the engine output power becomes lower if the engine output power becomes not higher than a predetermined value which has been previously set, and accordingly, the divergence control valve is closed.

5. A gas engine system in which air fed through a turbocharger is mixed with fuel gas flowing through a fuel gas supply line and controlled as to a fuel supply quantity by a fuel flow control valve, and a thus obtained mixture gas is fed into a combustion chamber in order to carry out ignition and combustion of an engine, comprising the gas supply pipe line diverged into a gas supply main pipe connected to the combustion chamber, and a gas supply diverging pipe diverged from the upstream side of the fuel flow control valve, wherein a flow rate of the fuel gas diverged into the gas supply diverging pipe is set to a constant value which is less than a flow rate of the fuel gas in the gas supply main pipe, and the gas supply diverging pipe is provided thereon with a divergence control valve subjected to ON/OFF control, for allowing the fuel gas to flow through the gas supply diverging pipe in a condition that the divergence control valve is opened, and the gas engine system comprises gas supply diverging branch pipes for feeding the fuel gas diverged via the divergence control valve from the gas supply diverging pipe into each of charging air inlet branch arm pipes connected respectively to an intake air port of a cylinder cover, and gas supply branch pipes for feeding the fuel gas in the gas supply main pipe into each of the charging air inlet branch arm pipes.

6. A gas engine system as set forth in claim 5, wherein the gas supply divergence branch pipe connected from the gas supply diverging pipe to each of the combustion chambers is provided thereon with a gas regulating valve for regulating the flow rate of the fuel gas.

* * * * *